US011702144B2

(12) United States Patent
Kotlarski et al.

(10) Patent No.: US 11,702,144 B2
(45) Date of Patent: Jul. 18, 2023

(54) MOTOR VEHICLE

(71) Applicant: Bayerische Motoren Werke Aktiengesellschaft, Munich (DE)

(72) Inventors: Piotr Kotlarski, Munich (DE); Gagan Saket, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 153 days.

(21) Appl. No.: 17/287,331

(22) PCT Filed: Oct. 17, 2019

(86) PCT No.: PCT/EP2019/078238
§ 371 (c)(1),
(2) Date: Apr. 21, 2021

(87) PCT Pub. No.: WO2020/083742
PCT Pub. Date: Apr. 30, 2020

(65) Prior Publication Data
US 2022/0111908 A1 Apr. 14, 2022

(30) Foreign Application Priority Data
Oct. 25, 2018 (DE) .................... 10 2018 126 597.2

(51) Int. Cl.
*B62D 25/08* (2006.01)
*B62D 25/02* (2006.01)
(Continued)

(52) U.S. Cl.
CPC ....... *B62D 25/2036* (2013.01); *B62D 25/025* (2013.01); *B62D 25/04* (2013.01);
(Continued)

(58) Field of Classification Search
CPC .. B62D 25/025; B62D 25/04; B62D 25/2036; B62D 25/085; B62D 25/2018;
(Continued)

(56) References Cited

U.S. PATENT DOCUMENTS

| 6,513,242 B1 | 2/2003 | Christofaro et al. |
| 6,926,352 B2 * | 8/2005 | Gotou .................. B62D 21/157 |
| | | 296/193.08 |

(Continued)

FOREIGN PATENT DOCUMENTS

| CN | 104443032 A | 3/2015 | |
| CN | 108482298 A * | 9/2018 | ......... B60N 2/42736 |

(Continued)

OTHER PUBLICATIONS

English translation of Chinese Office Action issued in Chinese Application No. 201980069368.4 dated Aug. 3, 2022 (10 pages).

(Continued)

*Primary Examiner* — Dennis H Pedder
(74) *Attorney, Agent, or Firm* — Crowell & Moring LLP

(57) ABSTRACT

A motor vehicle has a body with a front section, a floor structure which adjoins the front section, and a floor panel, on the two longitudinal sides of which a sill is in each case arranged. The sills run from an A pillar, adjoining the front section, of the body as far as a C pillar of the body. An inner longitudinal member is on each longitudinal side of the floor panel. A bulkhead is arranged between the front section and the floor structure. Each sill is constructed from an inner C profile and an outer C profile. The first and second profile flanges of the C profiles, arranged in an overlapping manner, are connected, in particular welded, to the inner longitudinal member.

12 Claims, 3 Drawing Sheets

(51) Int. Cl.
    *B62D 25/20*     (2006.01)
    *B62D 25/04*     (2006.01)
    *B62D 27/02*     (2006.01)
    *B62D 27/06*     (2006.01)
    *B62D 21/11*     (2006.01)

(52) U.S. Cl.
    CPC ....... B62D 25/085 (2013.01); B62D 25/2018 (2013.01); B62D 27/02 (2013.01); B62D 27/065 (2013.01); B62D 21/11 (2013.01)

(58) Field of Classification Search
    CPC ...... B62D 27/023; B62D 21/11; B62D 25/14; B62D 25/08
    USPC ......... 296/209, 193.06, 204, 29, 30, 203.01, 296/203.04
    See application file for complete search history.

(56) References Cited

U.S. PATENT DOCUMENTS

| | | |
|---|---|---|
| 2013/0009424 A1 | 1/2013 | Herntier |
| 2013/0049408 A1 | 2/2013 | Kurogi et al. |
| 2015/0084375 A1 | 3/2015 | Asano et al. |
| 2017/0106914 A1 | 4/2017 | Abe |
| 2017/0297628 A1 | 10/2017 | Iyoshi et al. |
| 2018/0244315 A1 | 8/2018 | Nakamura et al. |

FOREIGN PATENT DOCUMENTS

| | | | | |
|---|---|---|---|---|
| DE | 101 29 738 A1 | 1/2003 | | |
| DE | 101 35 197 A1 | 2/2003 | | |
| DE | 102005044062 A1 | * 5/2007 | ............. | B60C 23/18 |
| DE | 10 2007 027 783 A1 | 12/2008 | | |
| DE | 10 2015 215 655 A1 | 2/2017 | | |
| DE | 102015215655 | * 2/2017 | ........... | B62D 25/025 |
| DE | 11 2017 000 106 T5 | 5/2018 | | |
| EP | 2 357 120 A1 | 8/2011 | | |
| EP | 2 815 953 A1 | 12/2014 | | |
| JP | 2003-237636 A | 8/2003 | | |
| JP | 2013-49378 A | 3/2013 | | |
| JP | 5201216 B2 | * 6/2013 | ............. | B62D 25/02 |
| JP | 2017-43135 A | 3/2017 | | |

OTHER PUBLICATIONS

International Search Report (PCT/ISA/210) issued in PCT Application No. PCT/EP2019/078238 dated Feb. 14, 2020 with English translation (six (6) pages).

German-language Search Report issued in German Application No. 10 2018 126 597.2 dated Jul. 10, 2019 with partial English translation (11 pages).

* cited by examiner

MOTOR VEHICLE

BACKGROUND AND SUMMARY OF THE INVENTION

The invention relates to a motor vehicle having a body which has a front carriage, and a floor structure which adjoins the front carriage and which has a floor panel, at the two longitudinal sides of which there is arranged in each case a sill panel which extends from an A-pillar, which adjoins the front carriage, of the body up to a C-pillar of the body.

In the configuration of the vehicle body of such a motor vehicle, there are a large number of aspects, requirements and laws which have to be taken into account. Particularly important in this instance is the crash safety of the motor vehicle for which great efforts are made. In addition to the crash safety, however, properties such as the rigidity of the body, the influences on the travel dynamics and the driver comfort and the background noise are also significant.

An object of the present invention is therefore to provide a motor vehicle of the above type whose body enables an improvement of the dynamic travel properties and an increase of the crash safety.

This object is achieved by the features of the independent claim.

In detail, the motor vehicle according to the invention has a body (aka a body-in-white) which comprises a front carriage, a floor structure and a rear carriage. In this instance, the floor structure adjoins the front carriage and comprises a floor panel, at the two longitudinal sides of which there is arranged a sill panel which extends from an A-pillar which adjoins the front carriage up to a C-pillar. An inner longitudinal carrier extends along each longitudinal side of the floor panel of the floor structure. There is further provided a front wall which is arranged between the front carriage and the floor structure.

According to the invention, in this instance the sill panel is constructed from an inner C-profile and an outer C-profile whose first and second profile flanges are arranged so as to overlap and are connected to the inner longitudinal carrier, wherein a welding is a particularly preferred embodiment of this connection.

The particular nature of the overlapping flanges of the two C-profiles enables all the metal sheets to be attached to each other using the same connection technology, wherein the floor panel is no longer welded in the Y direction on the longitudinal carrier but instead on the inner C-shaped sill panel in the Z direction. Consequently, the welding locations on the floor panel flange are subjected to shearing loads, whereby they can absorb twice as great a load in comparison with the previous connection.

The Y direction and Z direction are in this instance intended to be understood to be directions of a coordinate system of the body in which the X direction corresponds to the longitudinal axis of the body but is directed counter to the forward travel direction of the motor vehicle. The Y direction faces toward the right-hand vehicle side and the Z direction faces upward, that is to say, in the direction toward the roof of the body.

For explanation, it should further be emphasized that the inner C-profile is intended to be understood to be the profile which faces the inner region of the body, whilst the outer C-profile is arranged at the outer side of the floor structure.

The dependent claims relate to advantageous embodiments of the invention.

In a preferred embodiment, the inner C-profile has a first member which adjoins the first profile flange and which is connected via a connection member to a second member which the second profile flange adjoins.

In another particularly preferred embodiment, there is provision for the floor panel to be connected to the second member of the inner C-profile, wherein a weld connection is again particularly preferred as the welding technique. This affords the advantage which has already been mentioned above that the floor panel can no longer be secured in the Y direction to the longitudinal carrier, but instead to the inner C-shaped sill panel in the Z direction, in particular welded.

In order to reinforce the C-profiles and consequently the sill panels, it is possible to arrange transverse bulkheads and/or foam inlays in the inner and/or outer C-profile.

An outer side frame profile which is fixed to the lateral longitudinal carrier is further arranged outside the outer C-profile.

The front carriage has two motor carriers which are spaced apart from each other and which preferably extend in a vehicle longitudinal direction and which are each secured by means of an outer connection profile to a front region of the respective sill panel/A-pillar facing the front carriage.

In this instance, it is possible for the connection profile to extend laterally below the front wall in the Y direction, wherein the motor carrier and the connection profiles externally form a 90° angle, preferably an angle greater than 90°.

Preferably, the connection profiles are constructed from two metal sheets.

It is thereby advantageously possible for the load path to be transmitted from the motor carriers in the best possible manner to the double-C-shaped sill panel, and to move a Y and Z offset between the motor carriers and the floor or sill panel in a homogeneous manner so that the motor carriers can be supported to the widest possible extent.

To this end, it is further preferably possible for the outer connection profiles to be located in an oblique manner both in the Y direction and in the Z direction, which reduces the free bending length of the motor carriers. In this instance, it is preferably possible for the connection profiles to be welded to the motor carriers in a positive-locking manner and not to be mounted on the associated sill panel laterally as before, but instead connected as an extension portion. The outer connection profiles can consequently preferably be connected to the respective sill panel in an abutting manner so that the force which is absorbed by the motor carriers can be introduced into the sill panel with relatively little offset.

Furthermore, it is preferably possible to give the connection profiles a ramp-like shape which, in the event of a crash, enables the rims to slide with a relatively small overlap, which reduces the accident energy which is intended to be absorbed for the body.

Furthermore, it is preferably possible to provide the connection profiles with an additional ramp-like metal sheet at the rear side thereof, which reinforces the connection profiles and enables a positive-locking fitting on the motor carriers. Furthermore, this enables a lateral fitting to the sill panels, preferably by means of double welding point rows. It is further preferably possible to reinforce the connection profiles by means of transverse bulkheads or introduction of foams into the cross-section thereof.

The advantage is further afforded that the support of the motor carriers both in the Z direction and in the Y direction reduces vibrations, decreases vibration excitations of the floor panel and increases the crash safety of the passenger compartment.

In another preferred embodiment, a support carrier can be arranged on the front wall of the body between a left and a right half of the vehicle, wherein an overlap with the respective A-pillar or the associated sill panel is possible.

Preferably, a central region of the support carrier extends along the path of a tunnel-like member, which extends from the front wall at least substantially along the vehicle center in the direction toward the rear carriage. It is thereby possible to support the support carrier in the floor assembly by the tunnel-like member, wherein the motor carriers preferably adjoin the support carrier in an obtuse manner and the cross-section of the support carrier closes the respective C-profile of the sill panels by the connection relative to the front wall.

It is thereby advantageously possible for the support carrier to stabilize the front wall and to be supported at the center on the tunnel-like member so that it is possible to absorb the load of the motor carriers.

It is further preferably possible to pull the two end regions of the support carrier down in the Z direction in order to be able to introduce the load without any offset into the respective sill panel since both components run into a node which is formed by the lower region of the A-pillar and the associated sill panel, which is achieved by an overlapping of the edge portions of the support carrier with the connection profiles, which advantageously enables better reinforcement of the front wall and a reduction of vibrations and an increased rigidity of the passenger compartment.

In another particularly preferred embodiment, the front axle carriers which are arranged at each vehicle side are connected to the associated motor carrier in each case by means of two, but preferably three screw connections which are in particular located in an X line. In this instance, it is possible to arrange a screw connection below the front wall in the region of the respective outer connection profile.

As a result of the positioning of the outer connection profiles according to the invention, it is advantageously possible at the lower side of the body to displace the rear screw connection location of the front axle carrier which is adjacent to the passenger compartment in an outward direction. The bearing location is consequently located at the lower side of the outer connection profile and leads to a curved form of the suspension, which in the event of a crash promotes the sliding of a rim with relatively little overlapping and advantageously reduces the pulse in the front-end crash and enables more stable guiding of the chassis (better support of the Y forces in the lower plane).

In another particularly preferred embodiment, at each vehicle longitudinal side there is provided a rear longitudinal carrier which is arranged adjacent to the rear carriage and which in each case has an extension portion, which is connected to the inner C-profile of the associated sill panel. It is thereby possible for the respective sill panel to be able to be moved into the rear longitudinal carrier with the receiving members for the rear axle carrier, wherein both extend at a different Z and Y level. In this instance, this offset can be introduced via the extension portion of the longitudinal carrier and the remainder of the longitudinal carrier can be arranged at the rear, that is to say, in the direction toward the rear carriage. In this instance, it is possible to connect the front end of the extension portion of the longitudinal carrier to the rear portion of the inner C-profile of the respective sill panel, wherein this connection is preferably provided in a manner overlapping behind a heel plate.

It is further preferably possible to connect the rear end of the extension portion of the longitudinal carrier to the front end of the rear longitudinal carrier, wherein the inner edge of the extension portion of the longitudinal carrier includes at the rear a Y-shaped curve in order to compensate for the Y offset.

It is further preferably possible to provide a lower belt of the extension portion of the longitudinal carrier at the rear with a Z-shaped curve in order to compensate for the Z offset.

Finally, the extension portion may preferably be fitted laterally to the associated sill panel, in particular welded, wherein the extension portion is adjoined at the upper side at the rear by the floor panel so that a homogeneous rigidity path between the sill panel and the respective longitudinal carrier is enabled.

In conclusion, it can be determined that according to the invention the following advantages can be achieved:

significantly more rigid body as a result of the double-C-shaped sill panel and the connection thereof;

more homogeneous load path extents from the motor carriers to the double-C-shaped sill panels up to the rear longitudinal carrier;

better load path in the sill panel as a result of the double-C-shaped profiles and the overlapping common flanges;

connection of the floor panel to the respective sill panel in the Z direction and consequently higher welding location strength as a result of heavy loading in the event of a side-on crash;

better connection/integration of the double-C-shaped sill panel to the load paths of the motor carriers at the front and rear with respect to the longitudinal carrier;

improved acoustics and improved vibration comfort as a result of the increased rigidity of the body;

improved travel dynamics as a result of the increased rigidity of the body;

safe passenger compartment in the event of a crash as a result of the increased rigidity of the body.

A body/body in white for a motor vehicle is defined as a subcombination of the invention.

Further details, features and advantages of the invention will be appreciated from the following description of the Figures of the drawings.

DETAILED DESCRIPTION OF THE DRAWINGS

Figure 1:
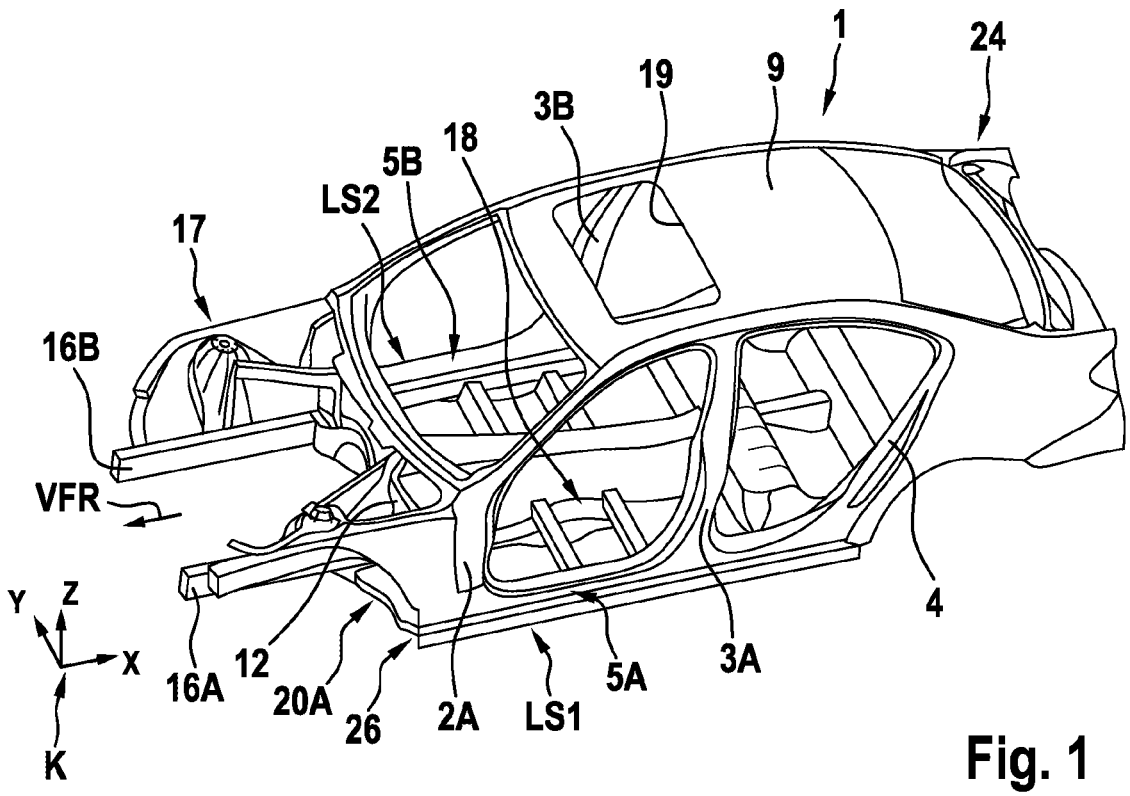
FIG. 1 is a schematically slightly simplified perspective illustration of an embodiment of a body in white/body of a motor vehicle according to the invention.
Figure 2:
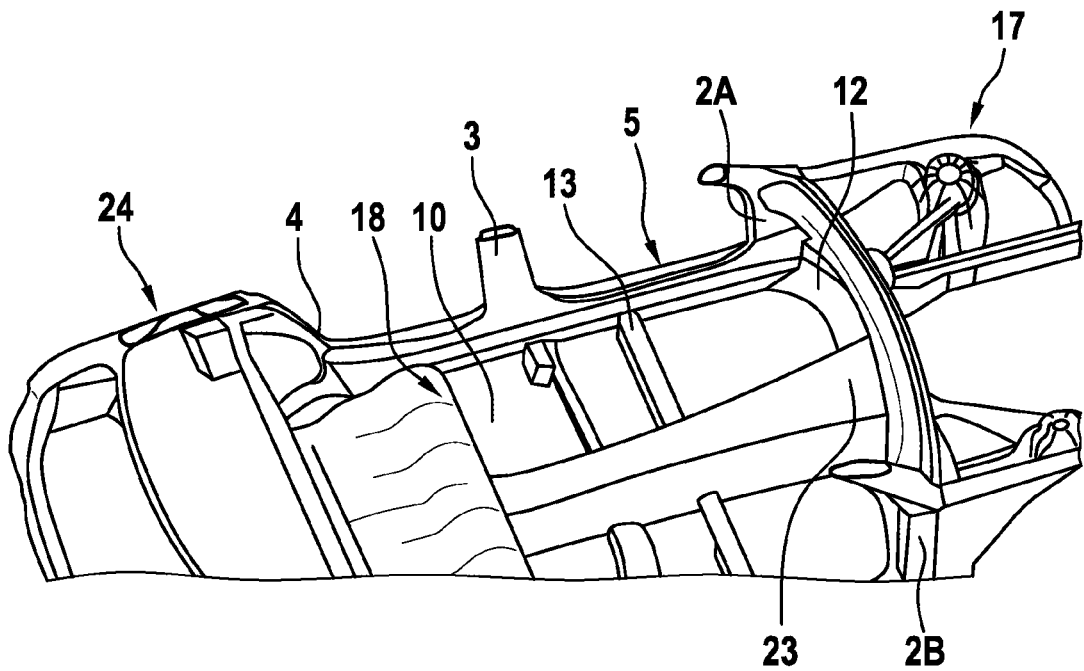
FIG. 2 is a perspective illustration of the body according to FIG. 1, in which for better illustration of a floor structure the roof of the body is removed.
Figure 3:
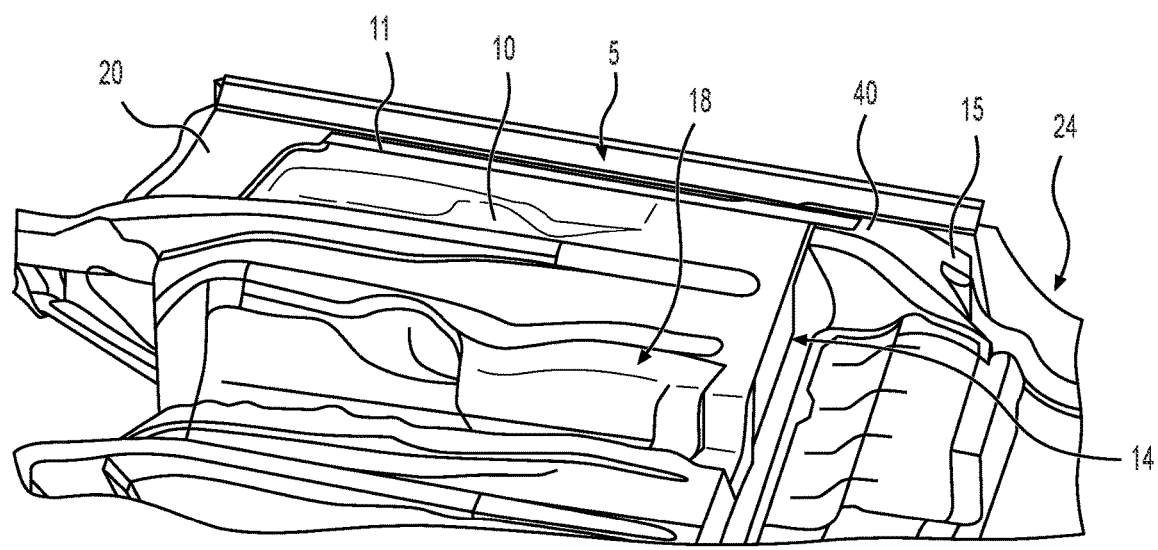
FIG. 3 is a perspective, partial illustration of the body in the region of the floor structure thereof and the rear carriage.

An overview of FIGS. 1 to 3 shows the general structure of a body 1, which can also be referred to as a body in white/bodyshell and which represents the motor vehicle. In addition to the features illustrated in FIGS. 1 to 3, the motor vehicle naturally includes all other features of a motor vehicle, such as, for example, motor, gear mechanism, chassis and wheels, etc.

The body 1 comprises as basic components a front carriage 17, a floor structure 18 and a rear carriage 24.

The floor structure 18 adjoins the front carriage 17 in the direction toward the rear carriage 24 and has a floor panel 10. At the longitudinal sides LS1 and LS2 of the floor panel 10 illustrated in FIG. 1 there is arranged in each case a sill panel 5A and 5B which extends from an A-pillar 2A, 2B of the body 1 which adjoins the front carriage 17 as far as a C-pillar of the body 1, wherein of the two C-pillars the C-pillar 4 can be seen in FIGS. 1 and 2.

Figure 4:
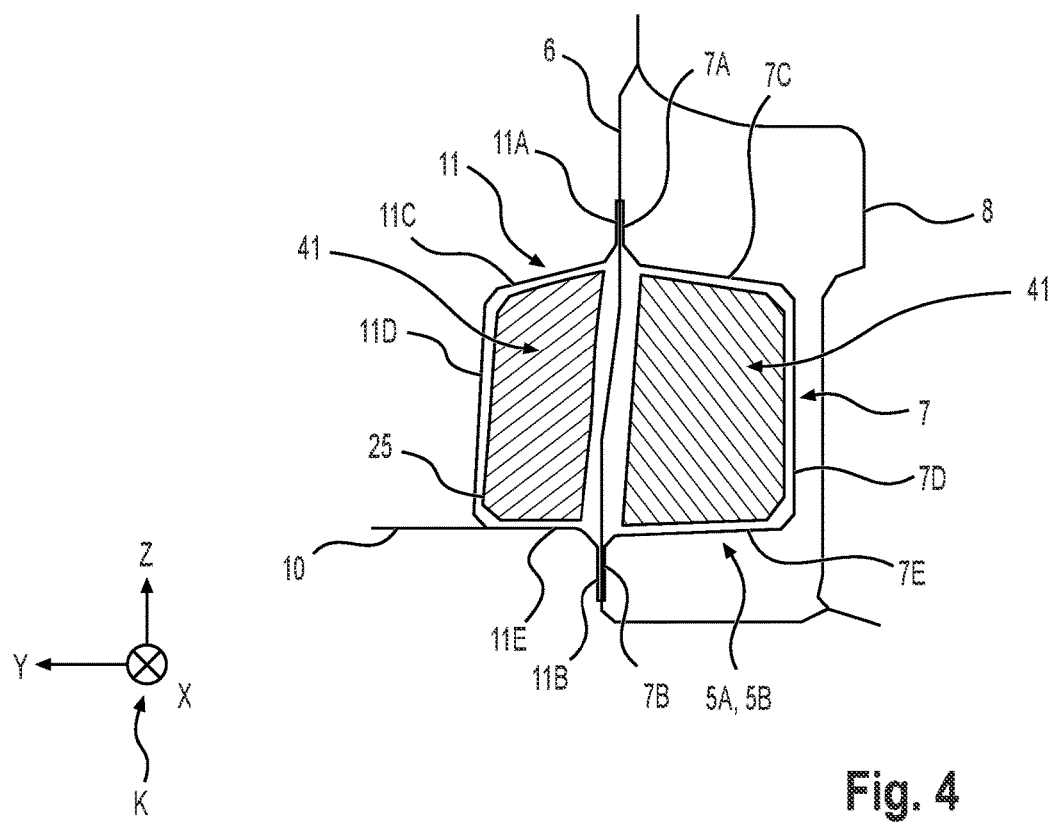
FIG. 4 is a schematically highly simplified illustration of a sill panel construction.

Furthermore, the body 1 has an inner longitudinal carrier at each longitudinal side LS1 and LS2 of the floor panel 10, wherein as a result of the selected illustration this longitudinal carrier 6 can only be seen in the schematically highly simplified schematic drawing of FIG. 4.

Furthermore, the body 1 has a front wall (bulkhead) 12, which can be seen in FIGS. 1 and 2 and which is arranged between the front carriage 17 and the floor structure 18.

Figure 6:
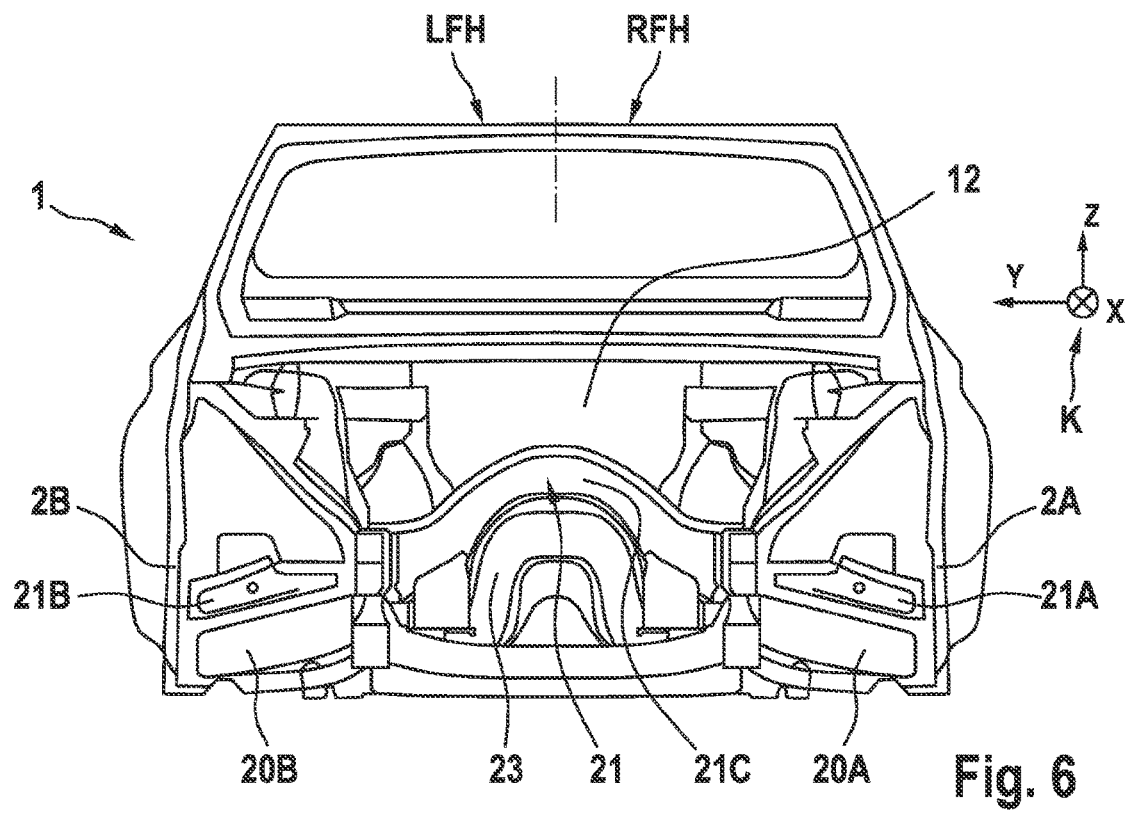
FIG. 6 is a front view of the body in order to explain the structure and the operation of a support carrier of the front wall of the body.

Finally, in FIGS. 1, 4 and 6, a coordinate system K with an X axis, a Y axis and a Z axis is illustrated and is drawn to explain the path of forces and arrangement of components of the body 1. In FIG. 1, the forward travel direction VFR is further illustrated with an arrow, wherein it can be seen that the X direction of the coordinate system K is orientated counter to this travel direction VFR. The Y direction faces the right vehicle side, which is depicted by the longitudinal side LS2. The Z direction faces upward, that is to say, in the direction toward the roof 9 of the body 1.

As can be seen in the schematic illustration of FIG. 4, each of the sill panels 5A and 5B has an inner C-profile 11 and an outer C-profile 7 whose first and second profile flanges 11A, 11B or 7A and 7B are arranged so as to overlap and abut the inner longitudinal carrier 6 to which they are connected, such as, for example, by means of a weld connection.

The inner C-profile, which is referred to as an inner profile since it faces the inner space of the body 1, has a first profile flange 11A which adjoins a first member 11C and which is connected via a connection member 11D to a second member 11E which is adjoined by the second profile flange 11B. Preferably, these members and the flanges are each at a right angle with respect to each other but, as indicated in FIG. 4, this does not always have to be the case since in the illustration of FIG. 4, for example, the member 11C has an angle of more than 90° with respect to the connection member 11D. The orientation of the members and the flanges may in this instance be adapted to the respective body conditions. Reference numeral 41 shows examples of transverse bulkheads and/or foam inlays arranged in the inner C-profile 11 and/or the outer C-profile 7.

FIG. 4 further explains in a schematically highly simplified illustration the floor panel 10 which in this particularly preferred embodiment is connected to the second member 11E, preferably by means of a weld connection 25.

FIG. 4 further explains that, outside the outer C-profile 7 which is arranged at the outer side of the body 1, there is arranged an outer side frame 8 which can be connected to the longitudinal carrier 6 at a first region and a second region.

FIG. 1 further explains that the front carriage 17 has two motor carriers 16A and 16B which are spaced apart from each other and which preferably extend parallel with each other and which are each secured by means of an outer connection profile 20A and 20B to a front region 26 of the respective associated sill panel 5A or 5B facing the front carriage 17.

The outer connection profiles 20A and 20B are in this instance preferably provided in front of and below the front wall 12.

FIG. 1 explains in this instance with reference to the motor carrier 16A that, similarly to the motor carrier 16B, it forms at least substantially an angle of 90°, preferably of more than 90°, with the associated connection profile 20A or 20B.

As already explained in the introduction, in a particularly preferred embodiment each of the connection profiles 20A and 20B is constructed from two metal plates which are intended to be connected to each other. However, it is also possible to use a larger number of metal plates.

FIG. 6 shows that, in another particularly preferred embodiment of the motor vehicle according to the invention or the body 1 according to the invention, a support carrier 21 is arranged on the front wall 12 between a left and a right vehicle half LFH or RFH.

The support carrier 21 has in this instance a central region 21C which follows a path of a tunnel-like member 23 of the body 1.

The motor carrier 16A or 16B which is associated in each case preferably adjoins the support carrier 21 in an obtuse manner, wherein the cross-section of the support carrier 21 as a result of the connection to the front wall 12 adjoins the associated C-profile of the respective sill panel 5A or 5B.

FIG. 6 further explains that the support carrier 21 has two edge portions 21A and 21B which extend downward in an inclined manner, that is to say, inclined relative to the Z axis, and are connected over their entire length to the respective associated connection profile 20A or 20B. For this connection, a weld connection or other suitable connection type is also preferably provided.

Preferably, the support carrier 21 can be pulled down as far as the sill panels 5A, 5B and in this instance a connection can be produced between the support carrier 21 and the outer connection profiles 20A, 20B. In addition, an extension of the inner C-profile 11 up to the front region of the connection profile 20A, 20B is possible.

Figure 5:
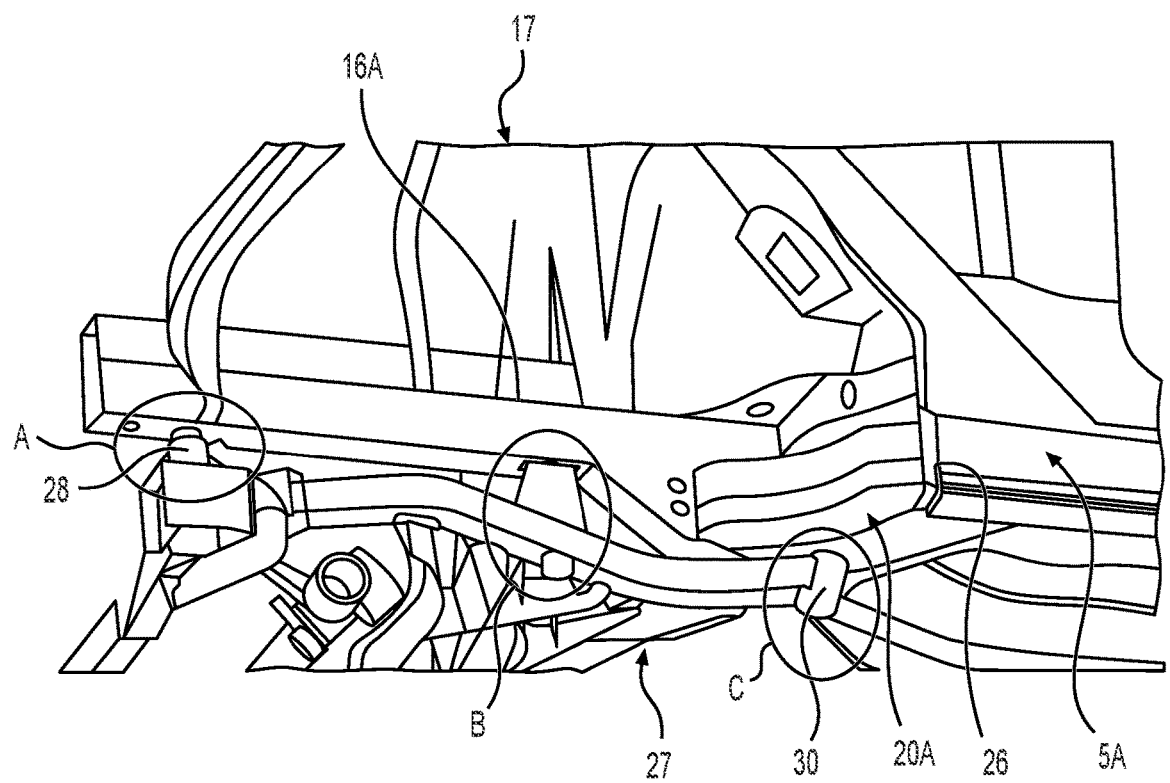
FIG. 5 is a perspective partial illustration of the body region, in which a front axle carrier is arranged.

The perspective illustration of FIG. 5 shows that, in another particularly preferred embodiment, the front carriage 17 has at each vehicle side a front axle carrier 27 which is connected to the respective associated motor carrier 16A or 16B. In this instance, in a particularly preferred embodiment, two, but particularly three screw connections which are in particular located on an X line are provided, wherein the last or rearmost screw connection 30 is preferably arranged below the front wall 12 in the region of the respective outer connection profile 20A or 20B. FIG. 5 explains in this instance the arrangement of the last or rearmost screw connection 30 in the region of the connection profile 20A (annotated as C), along with a first screw connection 28 (annotated as A) and a second screw connection (annotated as B).

As a result of this positioning, there is produced externally a better Y support for better travel dynamics and pulse reduction in the event of a front-end crash as a result of greater flexibility in the front axle carrier longitudinal pipe.

FIG. 3 explains another particularly preferred embodiment, in which at each vehicle longitudinal side a rear longitudinal carrier is provided. As a result of the illustration selected in FIG. 3, only one of the longitudinal carriers is given the reference numeral 15. The longitudinal carrier 15 is in this instance arranged adjacent to the rear carriage 24 and has an extension portion 40, which is connected to the inner C-profile 11 of the sill panel. In this instance, the extension portion 40 of the rear longitudinal carrier 15 performs a comparable function to the front connection profile. In the event of an accident, the crash load is transmitted from a carrier to the double-C-shaped sill panel 5A or 5B. As a result of the provision of the second inner C-profile 11, the extension portion 40 can be secured to the C-shaped sill panel. This affords the advantage of a significantly more homogeneous load path. FIG. 3 also shows the arrangement of the heel plate 14.

In addition to the above written disclosure of the invention, in order to complement the disclosure reference may hereby explicitly be made to the graphic illustration of the invention in FIGS. 1 to 6.

LIST OF REFERENCE NUMERALS

1 Body/body in white
2A A-pillar
2B A-pillar
3 B-pillar
3A B pillar
3B B-pillar
4 C-pillar
5A Sill panel
5B Sill panel
6 Inner lateral longitudinal carrier
7 Outer C-profile
7A First profile flange
7B Second profile flange
7C First member
7D Connection member
7E Second member
8 Outer profile
9 Roof
10 Floor panel/floor plate
11 Inner C-profile
11A First profile flange
11B Second profile flange
11C First member
11D Connection member
11E Second member
12 Front wall
13 Seat transverse carrier
14 Heel plate
15 Rear longitudinal carrier
16A Motor carrier
16B Motor carrier
17 Front carriage/front carriage structure
18 Floor structure
19 Roof cut-out
20A Outer connection profile
20B Outer connection profile
21 Support carrier
21A Edge portion
21B Edge portion
21C Central region
23 Tunnel-like member
24 Rear carriage/rear carriage structure
25 Weld connection
26 Front region
27 Front axle carrier
28 Screw connection
30 Screw connection
40 Extension portion
K Coordinate system
VFR Forward travel direction
LS1 Longitudinal side
LS2 Longitudinal side
LFH Left vehicle half
RFH Right vehicle half

What is claimed is:

1. A motor vehicle, comprising:
a body, the body comprising:
a front carriage;
a floor structure which adjoins the front carriage and which has a floor panel, at the two longitudinal sides of which there is arranged in each case a sill panel which extends from an A-pillar, which adjoins the front carriage, of the body up to a C-pillar of the body;
an inner longitudinal carrier at each longitudinal side of the floor panel; and
a front wall which is arranged between the front carriage and the floor structure, and
a support carrier arranged on the front wall between a left and a right vehicle half, wherein
each sill panel is constructed from an inner C-profile and an outer C-profile whose first and second profile flanges are arranged so as to overlap and are connected to the inner longitudinal carrier,
the inner C-profile has a first member which adjoins the first profile flange and which is connected via a connection member to a second member which the second profile flange adjoins,
the floor panel is connected to the second member of the inner C-profile,
the front carriage has two motor carriers,
a respective one of the motor carriers adjoins the support carrier in an obtuse manner, and
a cross-section of the support carrier is closed by the connection relative to the front wall.

2. The motor vehicle according to claim 1, wherein
a weld connection is provided as at least one of the connections.

3. The motor vehicle according to claim 1, further comprising:
transverse bulkheads and/or foam inlays arranged in the inner and/or outer C-profile.

4. The motor vehicle according to claim 1, further comprising:
an outer side frame profile arranged outside the outer C-profile.

5. The motor vehicle according to claim 1, wherein
the two motor carriers are spaced apart from each other and are each secured by a respective outer connection profile to a front region of a respective sill panel facing the front carriage.

6. The motor vehicle according to claim 5, wherein
the connection profiles extend laterally in front of and below the front wall.

7. The motor vehicle according to claim 5, wherein
each respective motor carrier externally forms an angle of at least 90° with the associated connection profile.

8. The motor vehicle according to claim 5, wherein
each connection profile is constructed from two or more metal sheets.

9. The motor vehicle according to claim 1, wherein
the support carrier has a central region which follows a path of a tunnel-shaped member of the body.

10. The motor vehicle according to claim 1, wherein
the support carrier has two edge portions which extend in a downwardly inclined manner and which are connected over an entire length thereof to the respective connection profile, and
the edge portions and the respective connection profile overlap a node which is formed by a lower region of the respective A-pillar and the respective sill panel.

11. The motor vehicle according to claim 1, wherein
the front carriage has a front axle carrier which is connected at each vehicle side to the respective associated motor carrier by at least two screw connections which are located in a line, and
one of the screw connections is arranged below the front wall in the region of the respective outer connection profile.

12. The motor vehicle according to claim 1, further comprising:
a rear longitudinal carrier at each vehicle longitudinal side arranged adjacent to the rear carriage, the rear longitudinal carrier having an extension portion, which is connected to the inner C-profile of the associated sill panel so as to overlap behind a heel plate.

* * * * *